April 13, 1937.  P. JOHANSON  2,076,846
METHOD OF MAKING A ROUGH SIDED RUBBER BONDED ABRASIVE WHEEL
Filed Jan. 4, 1936
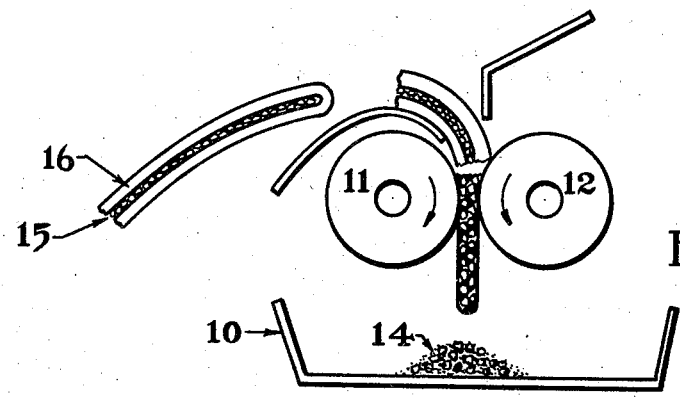
Fig. 1.
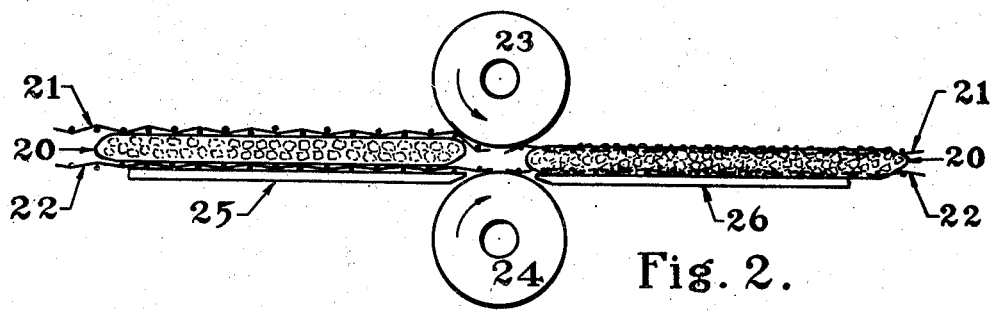
Fig. 2.
Fig. 3.
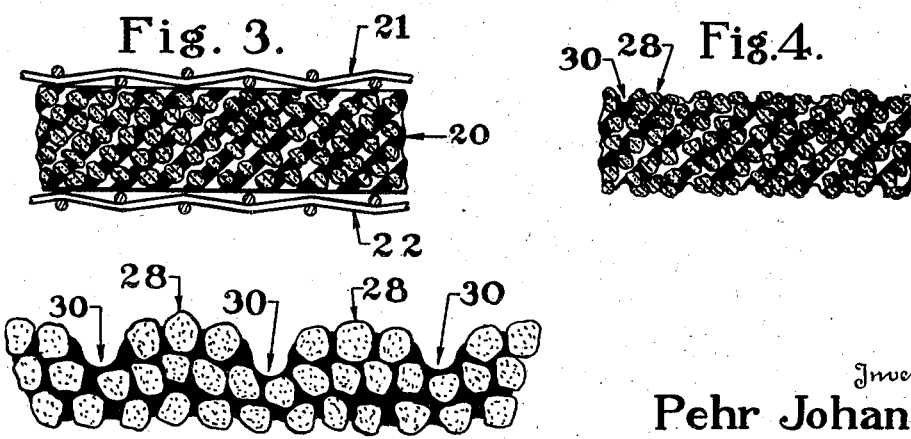
Fig. 4.
Fig. 5.
Witness
Robert G. Trumbull
Inventor
Pehr Johanson
By Clayton L. Jenks
Attorney Patented Apr. 13, 1937

2,076,846

UNITED STATES PATENT OFFICE 2,076,846

METHOD OF MAKING A ROUGH SIDED RUBBER BONDED ABRASIVE WHEEL

Pehr Johanson, Boylston, Mass., assignor to Norton Company, Worcester, Mass., a corporation of Massachusetts Application January 4, 1936, Serial No. 57,476

1 Claim. (Cl. 51—278)

This invention relates to rubber bonded abrasive wheels, and particularly to a method of making a disk shaped wheel adapted for rapidly cutting deep narrow grooves or cutting off pieces from articles, such as metal, carbon, glass etc., as well as for other purposes.

The standard rubber bonded cutting off wheel has smooth sides, inherent in the process of manufacture, and such a cutting-off wheel, which is generally very thin and fragile, is required to operate at a high speed, so that the excessive heat of the grinding operation is likely to cause a softening of the wheel bond and to result in uneven stresses within the wheel structure and changes in its abrading characteristics, thereby causing warpage and often breakage of the wheel and injury to the work as well as endangering the machine operator. The wheel does most of its cutting on its peripheral edge but owing to the frictional drag on the sides of the cut, the side faces of the wheel become worn so that the wheel ultimately acquires a tapered shape which is thinner at its periphery than adjacent to the center of the wheel. This tapered shape accentuates the frictional drag on the wheel sides and so further hampers the cutting operation. To overcome these problems, it has been proposed to provide the side of the cutting off wheel with spaced abrasive teeth which abrade the sides of the work as it is cut by the wheel periphery and so render the wheel capable of a cool and rapid abrading operation.

The primary object of this invention is to provide a simple and efficient method of forming such teeth in a wheel made of rubber bonded abrasive grains which can be used in connection with standard wheel making procedure without requiring the use of further expensive apparatus or elaborate changes in the procedure of making the wheel. Other objects will be readily apparent in view of the following disclosure.

In accordance with this invention, a cutting-off wheel, having abrasive grains united integrally by a rubber bond, is provided with rough sides adapted to provide clearance and to promote a cool cutting operation by impressing a pattern upon the sides of the wheel prior to hardening the bond. This pattern is preferably formed by a wire screen of suitable mesh or other suitable device, and it is preferably impressed into the sides of the plastic vulcanizable rubber and abrasive body by placing the body between two wire screens and then passing the assemblage between two space pressure rolls which serve to imbed the screens within the rubber abrasive mixture. This serves to orient the abrasive grains adjacent to the wire screen and to force them upwardly into the spaces between the wires and thus to provide an irregularly shaped body having spaced abrasive teeth projecting from the wheel sides. After removing the screen from the sides of the pressed rubber mass, the body may be vulcanized and the pattern fixed therein.

Referring to the drawing, I have there shown diagrammatically the nature of this type of cutting off wheel as well as the various steps required for making the same, in which:—

Fig. 1 diagrammatically illustrates the method of compounding the abrasive and crude rubber to form an unvulcanized mass of substantially the required thickness which is to have the abrasive teeth imprinted thereon;

Fig. 2 shows diagrammatically the manner of rolling out a sheet of the rubber abrasive material and impressing the wire screen into the face of the rubber body and forming the abrasive cutting teeth;

Fig. 3 illustrates in an enlarged diagrammatic sectional view the rubber body having the screen laid on each side thereof;

Fig. 4 shows diagrammatically the nature of the structure after the screens have been embedded therein and removed; and Fig. 5 is a greatly enlarged view showing the imprint of the wire screen and the teeth of abrasive grains oriented into the spaces between the wire meshes.

Although the rubber and abrasive may be mixed into a vulcanizable plastic body by various procedures, one suitable method, as illustrated diagrammatically in Fig. 1 of the drawing, involves milling a mass of crude rubber between a pair of rolls and embedding therein the desired amount of abrasive grains as well as the vulcanizing agent and accelerator. According to this procedure, a definite amount of the abrasive grain, sulfur, and vulcanization accelerator may be placed in a pan 10 located beneath two heated revolving rolls 11 and 12 which are adapted to be adjusted to and from one another to roll the mass of rubber therebetween and work it into a required condition. The machine may be of standard or any suitable construction which is adapted for the purpose. In this procedure, a mass of crude rubber is passed repeatedly through the rolls of the machine which are set close enough together so that the rubber is worked and gradually brought into a softened and plastic condition. As the rubber is passed downwardly between the rolls, as indicated in Fig. 1, the sticky mass is allowed to drop into contact with the abrasive and vulcanization mixture 14 lying within the pan. Then the rubber sheet, to which some abrasive and vulcanization material clings, is folded over with the granular material 15 held between the folds 16 as illustrated at the left hand side of Fig. 1. Then this mass is passed again through the machine and the grains are embedded within the rubber folds and thus forced into intimate association therewith. By repeatedly coating the rubber sheet with more abrasive and sulfur compound and folding the same into place and then passing it again through the rolls, the abrasive and vulcanization material is ultimately incorporated in a fairly uniform distribution throughout the rubber body. Then the rubber abrasive mass is taken to the machine indicated in Fig. 2 and there rolled out into a sheet of substantially the required thickness, but preferably slightly oversized, such as 0.005 inch, so as to provide sufficient material for the next step. It will be understood that this rubber and abrasive mixture may be compounded by various other procedures and that this first step merely involves incorporating the abrasive and vulcanization materials thoroughly within the rubber so as to provide a rubber and abrasive sheet of substantially the required thickness for the cutting-off wheel.

The preferred method of printing the required pattern on this plastic mass of rubber and abrasive involves placing the rubber mass 20 (Figs. 2 and 3) between two wire screens 21 and 22 of suitable wire size and mesh and then passing the same between pressure rolls 23 and 24 of required size and separation. This may be done in two stages by using one screen at a time, or only one side may be made rough, if such is desired. When the assembly of rubber abrasive mixture and the wire screens has been forced between the rolls of definite spacing, the wire screens will be embedded within the sides of the rubber abrasive sheet and some of the abrasive grains will be forced upwardly into the spaces between the wire strands, thus orienting the abrasive grains and causing them to project outwardly as sharp edged teeth which are substantially free from bond on their outer edges. In this process, the heated rolls 23 and 24 are suitably rotated as indicated by the arrows so as to draw the wire and rubber assembly through the machine from the table 25 to the table 26. The net result of this is to embed the wire screen into the face of the rubber abrasive sheet so that after removal of the screen, the body will appear as indicated in Figs. 4 and 5.

This procedure is intended to form projecting teeth on the sides of the cutting-off wheel. While the wire screen may be of such size and mesh as to cause only a single abrasive grain to project into the spaces between the wires, it is preferable, as indicated in Fig. 5, that the screens be so placed that two or more abrasive grains may project into this spacing. The preferred wire mesh is 20 to the linear inch for abrasive material which is 60 and finer grit size. For coarser abrasive, I may use a 10 mesh screen. That is, one should use a fine screen for fine abrasive and coarse screen for coarse abrasive. The wire size may be varied widely but it is preferable to use a wire which has a diameter of not over one third the mesh width, as shown in Fig. 5. The pattern is preferably one in which the clearance spaces are not smaller in width than the diameter of the average abrasive grain.

It will also be apparent that the abrasive grains are compacted into a somewhat closer position adjacent to these wires, which thus provides the face of the wheel with somewhat more abrasive than has the interior of the wheel. Consequently, the sides of the wheel are capable of a greater abrasive action than has the periphery of the wheel. The single abrasive grains or clusters thereof which project into these spaces and form the sharp edged cutting teeth thus constitute the major portion of each side of the wheel. These teeth are spaced by the comparatively wide clearance spaces 30 (Fig. 5) formed by the wires, which leave plenty of room for the loose abrasive grains or chips of material cut from the work by the abrasive teeth 28 and by the periphery of the wheel.

Although the pattern is preferably imprinted by means of a wire screen, it will be apparent that one may use other forms of patterns and that this pattern may, in fact, be formed in the faces of the rolls of the machine indicated in Fig. 2, or other suitable devices may be employed for the purpose. It is also apparent that the pattern need not be of a regular design, although it is desirable that the teeth have substantially the same spacing in order that the wheel may have uniform grinding characteristics.

By this procedure, I insure the formation of the required spaced teeth on a plastic rubber abrasive sheet and yet have a sheet of the desired thickness and abrasive characteristics. If the assembly of screens and rubber were subjected to pressure in a hydraulic press, it would be difficult to shape the mass satisfactorily, due to the plasticity of the mass and its flowing readily. By using spaced rolls which are forced to stay in a given relationship, I insure that the sheet comes to the exact required width and has its spaced teeth of correct dimensions. The method does not require the use of different apparatus in a plant already equipped for making smooth sided rubber abrasive wheels by the general procedure of Figs. 1 and 2. One merely adds the proper screens to the equipment and modifies the procedure as above indicated. Various other advantages in this method will be apparent.

I claim:

The method of making a rough sided rubber bonded abrasive wheel comprising the steps of incorporating abrasive grains and a vulcanizing agent in a mass of crude rubber, rolling the same into the form of a sheet, placing the sheet in contact with a wire screen and passing the assembled screen and sheet between spaced rolls and thereby impressing the screen pattern in the face of the sheet, thereafter removing the screen, cutting a disk therefrom and vulcanizing the disk, and thus providing a wheel of required thickness and structure having a surface of spaced abrasive teeth and clearance spaces therebetween.

PEHR JOHANSON.